United States Patent

Noel et al.

[11] Patent Number: 6,062,450
[45] Date of Patent: *May 16, 2000

[54] FORK PINCHING ASSEMBLY FOR A BICYCLE ANCHOR

[75] Inventors: James R. Noel, Hamden; Thomas A. Chimenti, Fairfield; Frederick G. Murray, Southington, all of Conn.; Jan Erik Johansson, Hillerstorp, Sweden

[73] Assignee: Industri AB Thule, Hillerstorp, Sweden

[*] Notice: This patent is subject to a terminal disclaimer.

[21] Appl. No.: 09/259,441

[22] Filed: Mar. 1, 1999

Related U.S. Application Data

[63] Continuation of application No. 08/954,739, Oct. 20, 1997, Pat. No. 5,875,947
[60] Provisional application No. 60/028,939, Oct. 21, 1996.

[51] Int. Cl.⁷ .................................................. B60R 9/00
[52] U.S. Cl. ........................ 224/315; 211/5; 211/17; 224/309; 224/324; 224/570
[58] Field of Search ..................... 224/315, 510, 224/309, 310, 319, 324, 924; 211/5, 17; 280/279

[56] References Cited

U.S. PATENT DOCUMENTS

| | | | |
|---|---|---|---|
| D. 358,123 | 5/1995 | Newbold et al. | D12/408 |
| 3,239,115 | 3/1966 | Bott et al. | 224/315 |
| 3,828,993 | 8/1974 | Carter | 224/323 |
| 3,848,784 | 11/1974 | Shimano et al. | 224/323 |
| 4,114,409 | 9/1978 | Scire | 70/225 |
| 4,274,569 | 6/1981 | Winter et al. | 224/319 |
| 4,629,104 | 12/1986 | Jacquet | 224/324 |
| 4,842,148 | 6/1989 | Bowman | 211/18 |
| 4,887,754 | 12/1989 | Boyer et al. | 224/319 |
| 4,934,572 | 6/1990 | Bowman et al. | 224/558 |
| 4,964,287 | 10/1990 | Gaul | 70/233 |
| 5,005,390 | 4/1991 | Giannini et al. | 70/225 |
| 5,037,019 | 8/1991 | Sokn | 224/558 |
| 5,042,705 | 8/1991 | Johansson | 224/315 |
| 5,052,605 | 10/1991 | Johansson | 224/324 |
| 5,065,921 | 11/1991 | Mobley | 224/493 |
| 5,118,125 | 6/1992 | Plunkett | 280/279 |
| 5,169,044 | 12/1992 | Englander | 224/324 |
| 5,226,341 | 7/1993 | Shores | 74/551.8 |
| 5,232,134 | 8/1993 | Allen | 224/521 |
| 5,265,897 | 11/1993 | Stephens | 280/293 |
| 5,275,319 | 1/1994 | Ruana | 224/316 |
| 5,291,763 | 3/1994 | Cuisinot | 70/201 |
| 5,362,173 | 11/1994 | Ng | 403/320 |
| 5,377,886 | 1/1995 | Sickler | 224/521 |
| 5,447,362 | 9/1995 | Nagano | 301/111 |
| 5,484,090 | 1/1996 | Lyshkov | 224/432 |
| 5,490,621 | 2/1996 | Dixon et al. | 224/319 |
| 5,492,258 | 2/1996 | Brunner | 224/321 |
| 5,511,894 | 4/1996 | Ng | 403/320 |
| 5,598,959 | 2/1997 | Lorensen et al. | 224/924 |
| 5,673,925 | 10/1997 | Stewart | 280/279 |

FOREIGN PATENT DOCUMENTS

| | | |
|---|---|---|
| 2221329 | 10/1974 | France . |
| 2332155 | 6/1977 | France . |

*Primary Examiner*—Gregory M. Vidovich
*Assistant Examiner*—Maerena W. Brevard
*Attorney, Agent, or Firm*—Royston, Rayzor, Vickery, Novak & Druce, L.L.P.

[57] ABSTRACT

A mechanism for releasably fixing a bicycle's fork upon a support. The mechanism includes a bicycle fork anchor having a fork pinching assembly that has two bicycle fork prong receiving portions. A handle is operably coupled to, or associated with the fork pinching assembly for configuring the fork pinching assembly between a bicycle fork pre-pinched position and a bicycle fork pinch-secured position. Also, the handle is located between the fork prong receiving portions. Supplementarily, an adjustable mounting may be included for permitting the bicycle fork anchor to be canted to a side within a substantially horizontal plane thereby turning the handle bars of a bicycle that is secured upon the bicycle fork anchor.

4 Claims, 3 Drawing Sheets

FORK PINCHING ASSEMBLY FOR A BICYCLE ANCHOR

RELATED PATENT APPLICATIONS

This patent application is a continuation of U.S. patent application Ser. No. 08/954,739 filed Oct. 20, 1997, now issued U.S. Pat. No. 5,875,947, and this patent application claims the benefit of U.S. Provisional Application No. 60/028,939 filed Oct. 21, 1996; the disclosure of each of such applications being expressly incorporated herein by reference.

DESCRIPTION

1. Technical Field

The present invention relates to securement means between articles of sports equipment and the racks or load carrier systems upon which those articles may be supported. More particularly, this invention relates to anchor means for securing the pronged end of a bicycle fork to a load carrying structure.

2. Background Art

The use of sports equipment in today's health conscious and outdoor activity inclined society is becoming evermore prevalent. In that many of the users of sports equipment reside in urban areas and must travel to distantly located areas to find the rural environment within which they most enjoy using the equipment, means have been developed for carrying their sports equipment upon vehicles. Examples of sports equipment transported directly upon a vehicle include small-sized boats such as kayaks. Snow skis, snow boards and other associated equipment are also transported on passenger vehicles to ski areas. Another common piece of sports equipment, and one with which the present invention is primarily associated, is bicycles. Traditionally, bicycles have been of rather standard and uniform construction and were used primarily as a mode of transportation. The construction of bicycles, as well as their intended environments for use have evolved substantially. It is now common for a rider to purchase a specific style and structured bicycle depending upon his or her primary intended riding purpose. One style is suited for leisure riding. An entirely differently structured bicycle will be purchased for racing purposes. Still further, and of more recent development are the more sturdily constructed bicycles commonly known as "mountain bikes". The intended environment for their use is implied in the name; that is, on rough mountainous terrain and in other environments having similar obstacles that must be negotiated. As a result, mountain bikes have found utility not only in the intended natural environments where a rider may be traversing rocky terrain, but riders have also found particular utility for mountain styled bicycles in urban settings where curbs, steps and ramps may be traversed.

Because of the increased popularity in bicycling, a commensurate increase in need for transporting the same has occurred. Not only are individual users and families of users purchasing and keeping more bicycles, but an increased rental market for bicycles has also developed. As a result, not only are there more bicycles requiring transport, but there are more bicycles requiring transport together at the same time. This has necessitated advancements in recreational load-carrier systems to better satisfy this need.

Well known systems for transporting bicycles are incorporated on both rear ends of vehicles and top sides of passenger compartments. One deficiency in current designs has been experienced because of the proliferation of bicycles and the need to carry more at one time. This has been compounded by the increased size of critical components affecting the load factor of bicycles on a given carrier system. An example may be found in mountain bikes having extended handle bars intended to increase leverage capabilities in climbing situations thereby enabling a rider to impart greater power to the drive wheels on sharp inclines. As a result of these extended length handle bars, fewer bicycles can be placed on a given load carrier in side-by-side relationship.

It is also more common now for users to have multiple bicycles that he or she rides at different times. As such, because of differing construction between the several bicycles, it is usual for the widths or thicknesses of the fork drop-outs or prongs on each bicycle to vary. For instance, the width of the drop-out on a racing bicycle will typically be significantly more narrow than a more sturdy dropout of the mountain bike. It is not unlikely, however, for an individual bicycle enthusiast to own both a racing and a mountain bike. It is also logical and equally as common for that user to desire to use the same carrier for both bikes. For these reasons, it has been recognized as desirable to have a fork anchor mechanism capable of variable clamping widths, both with respect to overall width of the fork and as to between the two prongs of a particular fork.

Still further, design criteria for particularly the mountain bike has altered the basic design of the bicycle fork system. Because of the higher stresses experienced in a mountain bike's support structure when traversing rugged terrain, certain structural components such as the fork extensions have been made larger and more sturdy. An increase in size has also resulted from the manufacture of such fork components from materials that are more yielding and serve a shock absorbing function. Similarly, gas filled shocks and other cushioning type components have been incorporated therein for providing a smoother and more plush ride to the user. All of these enhancements have increased the size and length of the forks to an extent that in many cases the front wheel of the bicycle may no longer be attached at a lowermost distal end of a conventionally constructed fork component. As a result, extensions off of the primary fork structure have been provided for the fork drop outs or prongs that permit their relative vertical location to be higher than at the lowermost end of the complete fork structure. Consequently, these downwardly extending portions intrude into known fork anchor lock designs and prevent proper operation of the handle for tightening and locking a bicycle to the anchor.

Present fork anchor designs employ a single skewer to which both prongs of a bicycle's fork are fixed. Typically, the skewer is held loosely within a base or housing and permitted to move freely from side to side until the bicycle fork is successfully placed thereupon with one prong on each end of the skewer at opposite exterior sides of the base. At times, the user of such an anchor experiences frustration during the loading process of the bicycle upon the anchor. It is not unusual for the carrier upon which the fork anchor is incorporated to be located above a vehicle's passenger compartment. In these cases, the loading process of the bicycle which requires it to be raised high into the air can be unwieldy and difficult to control. This often results in one of the bicycle prongs striking one end of the skewer and knocking the skewer to one side of the base so that the prong receiving portion of the skewer that was struck by the prong is then hidden within the base and an unduly long portion of the skewer extends from the opposite side of the base. This becomes frustrating because the user may not be able to handle the raised bicycle with a single hand, freeing the other to reposition the skewer so that both ends are once again exposed on either side of the base and ready to receive both prongs of the fork.

In view of the above described deficiencies associated with the use of known fork block or anchor systems, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventional fork block devices and incorporates several additionally beneficial features. Of three important enhancements incorporated into the present invention, the first is a centralized actuation means in the form of a handle located between the fork engaging portions of the pinch-securing means of the fork anchor, and in turn, also between the fork of a bicycle secured thereto. The second feature is the incorporation of a means for permitting translation or predominantly rotational movement of the fork anchor substantially within a horizontal plane . The third feature is the inclusion of a design for the skewer assembly that causes each of the two ends of the skewer exposed outside of the anchor base to be biased outwardly into an extended position until purposefully contracted inwardly into a securing orientation. This facilitates the loading of a bicycle upon the fork anchor, even when the skewer is inadvertently struck by a fork prong during the loading process because the fork engaging portion of the skewers retains or regains an exposed position outside of the anchor's housing.

The accommodation of differently sized forks and prongs is permitted through the independent and separate construction of a pair of skewers, one skewer on each side of the fork anchor. Because each skewer is separate from the other, one can be contracted to a greater degree than the other thereby accommodating variations in the thicknesses of the fork prongs or dropouts that must install over the shank of the skewer at the bicycle fork prong receiver portion when anchored thereto. Independent contraction capabilities combine with a floating feature of the skewer carrying assembly so that not only may variable widths of the fork prong be accommodated, but the imposition of similar pinch pressures may be exerted on each of the prongs. A slight clearance or gap space is provided in the contraction and expansion mechanism's assembly that facilitates the floating feature and accommodates slight width differences between the two different fork prongs of a bicycle that may result from manufacturing tolerances or uneven wear by as much as one millimeter. In the illustrated embodiment, this gap space is a clearance space provided between the handle and the base within which the handle is pivotably connected.

By adding a biasing member or extension mechanism such as a coil spring between the two skewers, each skewer is urged to an extended position until purposefully contracted into a securing orientation. The magnitude of the outward pressure exerted upon the skewers is such that each will be urged to an extended position, but that pressure is easily overcome by the contracting mechanism that moves the skewers into the fork securing orientation. This same feature of balancing the extending lengths of the skewer assembly on either side of the anchor's base may also be affected with a single, unified skewer. In such a configuration, a biasing member may be coupled to the skewer and that member applies a balancing force that urges or keeps the skewer in a substantially centered orientation with respect to the anchor's base.

Still further, in at least one embodiment, a pressure sensitive actuator is included that limits the force that may be input into the skewer contracting system so that too great a pinching force that could result in damage to the fork prongs is preventable.

As described above, one of the most obvious and notable developments incorporated into the present invention is the location of the actuation handle between the fork engaging portions of the two skewers, and resultingly between the bicycle fork prongs. This operational area for the handle may be most advantageously utilized because it is a clearance space that is inherent in the bicycle's construction. That is to say, the space between the prongs remains free of structural components of the bicycle because the rotating front wheel is interposed therein when the bicycle is being used and that wheel must be allowed to operate freely therein without interference. Therefore, during transport or storage of the bicycle with the front wheel removed, this space will still be vacant and serves as a prime location for a centralized handle or actuator of a bicycle fork anchor assembly. Still further, the movement of this actuating handle may also be confined to this intermediate space where it is free from impedance when moved between closed and opened orientations corresponding to pre-pinched and pinch-secured positions of the skewers.

The enhanced nature of this design may be best appreciated with respect to the modified forks of a mountain bike that have an extension off of the primary fork column for carrying the fork prongs at a distance therefrom and at a height greater than the lowermost portion of the fork columns. This lower portion of the fork column projects downwardly farther than the fork prongs. This structure is incompatible with an anchor having a side positioned handle that matingly engages the base of the fork anchor and optionally locks thereto. The extended portion of the fork column occupies the same space intended for the closed side handle thus rendering such an anchor design inoperable. These detrimental effects are remedied by the present invention where the handle is located in the always clear space between the two prongs of the bicycle fork.

As described hereinabove, it is common for handle bars, especially of mountain bikes to be extended thereby increasing the bicycle's overall width. On load carriers where bicycles are positioned side-by-side and adjacent to one another, this can prove limiting because of the fixed width of the transporting carrier. This effect is primarily attributable to the fact that in conventional bicycle fork anchors, the anchor is permanently configured so that the handle bars are oriented substantially perpendicularly to the bicycle's length and frame. The present invention very simply alleviates this problem by optionally including a swivel, a vertical post pivot, or a translation/rotation table at the fork anchor base so that the portion of the anchor to which the skewer is connected may be angularly oriented or turned with respect to the lengthwise orientation of the balance of the bicycle's frame. By so orienting the forks, the handle bars are similarly angled and the overall width of the bicycle is dramatically decreased thereby facilitating the side-by-side positioning of a greater number of bicycles upon the same narrow carrier width. This reduction in width can be substantial when considering that as much as three or four inches may be added to a mountain bike's handle bar's length. The angle at which the fork anchor portion may be angled to the lateral centerline of the carrier is contemplated to be as much as forty degrees, or more. Not only does this permit a greater number of bicycles to be installed upon a fixed width carrier, but other equipment may also be added to the carrier for simultaneous transport in view of the reduced effective width of each bicycle resulting from cocking the forks and handle bars to the side.

In at least one embodiment, the present invention takes the form of a mechanism for releasably fixing a bicycle's fork upon a support. The mechanism includes a bicycle fork anchor having a fork pinching assembly that has two bicycle fork prong receiving portions. A handle is operably coupled to, or associated with the fork pinching assembly for configuring the fork pinching assembly between a bicycle fork pre-pinched position and a bicycle fork pinch-secured position. Also, the handle is located between the fork prong receiving portions. Supplementarily, an adjustable mounting may be included for permitting the bicycle fork anchor to be canted to a side within a substantially horizontal plane thereby turning the handle bars of a bicycle that is secured upon the bicycle fork anchor.

In another embodiment, the present invention takes the form of a mechanism for releasably fixing a bicycle's fork upon a support in which a skewer assembly is at least partially received within a bicycle fork anchor and the skewer assembly has two fork prong receiving portions that are each located exteriorly to opposite sides of the bicycle fork anchor. An exterior bearing surface is arranged upon the bicycle fork anchor and configurable to secure the bicycle's fork to the anchor. In this embodiment, a handle is operably coupled to the bicycle fork anchor for configuring the exterior bearing surface between a bicycle fork pre-pinched position and a bicycle fork pinch-secured position. Further, the handle is located between the fork prong receiving portions.

In yet another embodiment, the invention takes the form of a mechanism for releasably fixing a bicycle's fork upon a support that has a bicycle fork pinching assembly. The fork pinching assembly includes a skewer assembly that is at least partially received within a bicycle fork anchor and the skewer assembly has two fork prong receiving portions each of which is located substantially exteriorly at opposite sides of the bicycle fork anchor. An exterior bearing surface is positioned upon the bicycle fork anchor and arranged for securing the bicycle's fork to the anchor. A handle is operably coupled to the fork pinching assembly for configuring the fork pinching assembly between a bicycle fork pre-pinched position and a bicycle fork pinch-secured position. As in other of the embodiments, the handle is located between the fork prong receiving portions.

The beneficial effects described above apply generally to each of the exemplary devices and mechanisms disclosed herein of the bicycle fork anchor. The specific structures through which these benefits are delivered will be described in detail hereinbelow.

MODE(S) FOR CARRYING OUT THE INVENTION

Figure 1:
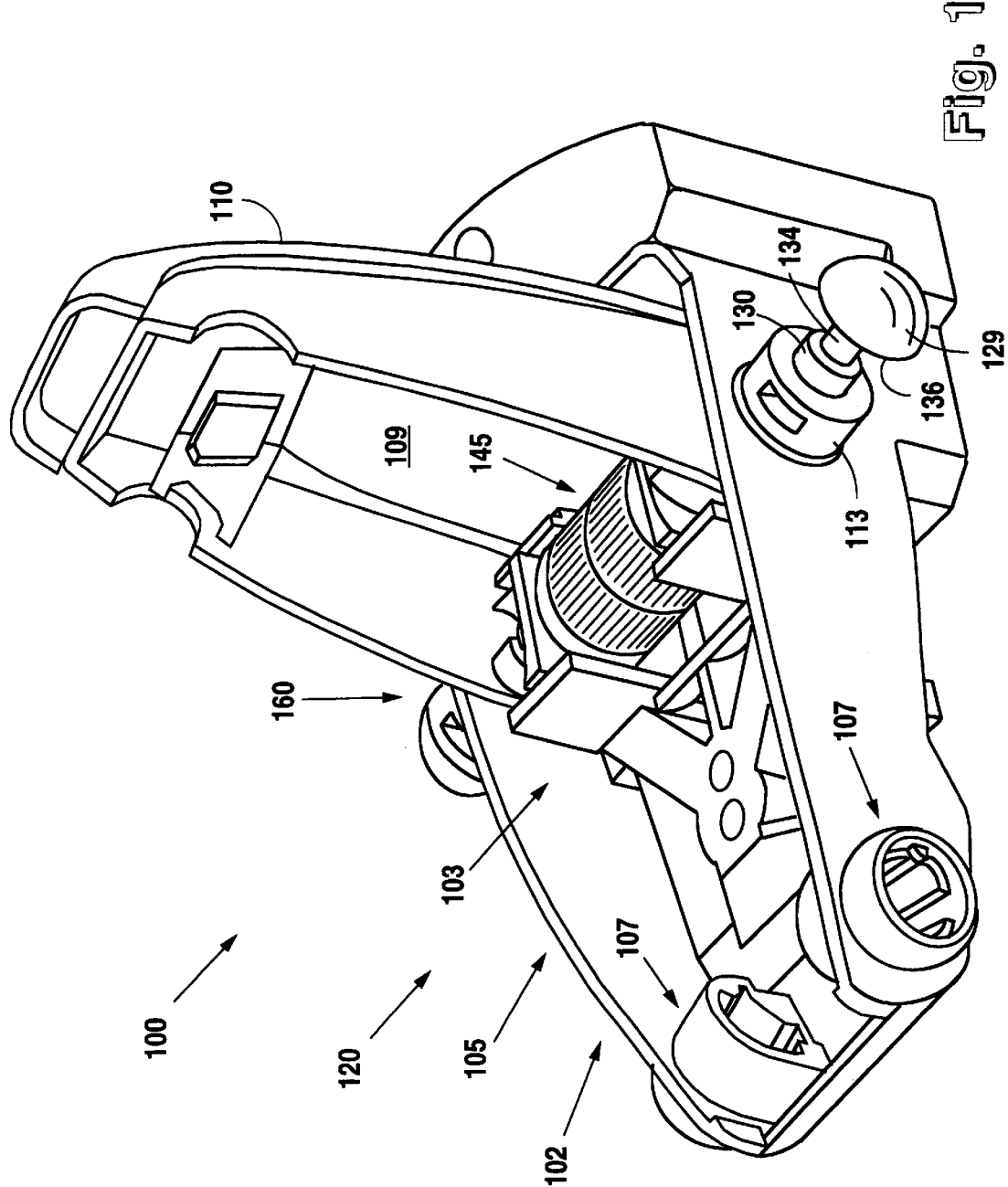
FIG. 1 is a perspective view of the bicycle fork anchor with the actuating handle in an open position corresponding to an expanded orientation of the skewer pair.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other. Certain components may be described as being "adjacent" to one another. In these instances, it is expected that a relationship so characterized shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

The present invention comprises a mechanism for releasably fixing a bicycle's fork upon a support such as a vehicular load carrier or a storage mount. In one embodiment, the mechanism includes a pair of skewers 123 that are at least partially received within a bicycle fork anchor 100 and the skewers 123 are movable one skewer 125 relative to the other skewer 130. The pair of skewers 123 are configured for fixing a bicycle's fork to the anchor 100. Each skewer 125,130 of the pair 123 is operable between a bicycle fork pre-pinched position and a bicycle fork pinch-secured position. Each skewer 125,130 of the skewer pair 123 is longitudinally aligned with the other of the skewers 125,130 and the skewers 125,130 are spaced apart from one another in at least one of the two positions. At least one handle 110 is coupled to the bicycle fork anchor 100 for operating at least one skewer 125,130 of the skewer pair 123 between the bicycle fork pre-pinched position and the bicycle fork pinch-secured position. The handle 110 is located between fork prong receiving portions 136 of the skewer pair 123 so that the handle 110 operates exclusively within a space between those receiving portions 136 and resultingly between the forks of a bicycle mounted thereupon. The paired skewers 123 is an exemplary configuration of a skewer assembly 122. Such an assembly further contemplates the utilization of a single shaft skewer upon which both fork prong receiving portions 136 are located.

Referring to the Figures, a centralized handled bicycle fork anchor 100 has a base 102 with an anchorable bottom base portion 155 and an upper portion configured to engage the fork of a bicycle to be mounted thereto. The base 102 carries a frame 105 upon which the several components of the anchor 100 are coupled together. In the illustrated embodiment, a centralized handle 110 is operatively coupled to a skewer contracting and expanding mechanism 135. The paired configuration of axially aligned skewers 125 and 130 is controlled by the contracting and expanding mechanism 135 to affect an anchoring procedure wherein the prongs of a bicycle fork are pinch-fixed or pinch-secured to the fork anchor 100. Each skewer 125,130 of the skewer pair 123 has a skewer head 129,134 located oppositely to one another and at a distance from exterior sides of the base 102 so that a fork prong receiving portion 136 of each skewer 125,130 is exposed interiorly of the skewer heads 129, 134.

A predominance of the working components of the fork anchor 100 are held within an interior compartment 103 of a housing 120 that serves not only to protect and conceal the working parts, but also to present a more aesthetically pleasing appearance to an observer. Also contained within the compartment 103 is a pre-load adjustment means 145 also referred to as an adjustment mechanism 145. The adjustment mechanism 145 is manually operatable to establish a sufficiently snug fit of the skewer heads 129,134 adjacent to outside surfaces of each fork prong so that the contracting mechanism 135 for the paired skewers 123 may impart a fixing or securing pinch-force upon the respective fork prongs. The contracting mechanism 135 incorporates a compensating mechanism 160 for accommodating variable widths between the two fork prongs of a particular bicycle and for assuring that substantially equal pinching forces are imparted to each prong.

The bicycle fork anchor 100 optionally incorporates a pivot mechanism or adjustable mounting 170 for permitting translation of the anchor 100 in a horizontal plane thereby providing a means for canting a secured bicycle's front wheel assembly and handle bars at an angle with respect to the rest of the bicycle's frame. An exemplary embodiment of such an adjustable mounting means includes a vertical post spindle 172 pivotally positioned within a receiving aperture on the carrier or rack structure, within the anchor 100 or within a platform upon which the bicycle fork anchor 100 is mounted. The pivot post or spindle 172 may be coupled to the anchorable bottom base portion 155 of the fork anchor 100. The adjustability of the spindle 172 in its receiving aperture accommodates continuously variable positioning through a predetermined range. Still further, discreet positions may be lockably established through various fixing means. It may be that constrictors are installed about the spindle 172 that act as brakes and fix the spindle with respect to the carrier. Alternative means for fixing the orientation may include pegged hole configurations and other similar and/or equivalent means. It is contemplated that with individual and independent adjustment or pivot means provided for each bicycle fork through the anchor 100 that each bicycle on a particular carrier may be similarly canted or individually oriented to suit and accommodate the other devices also mounted thereon.

Figure 2:
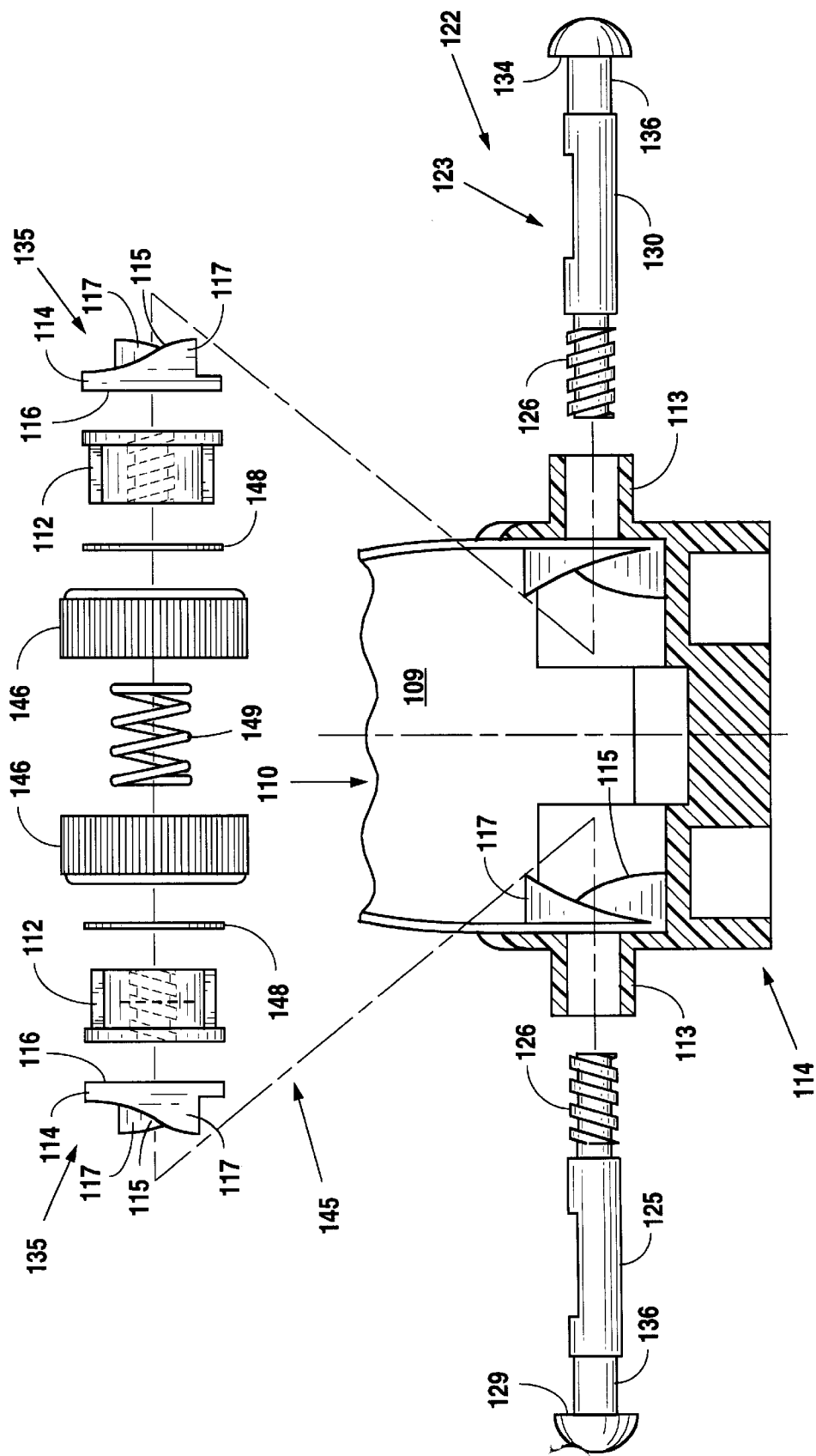
FIG. 2 is an exploded assembly drawing of the contracting mechanism shown in partial cross section.

Referring to FIGS. 1 and 2, an exemplary construction of the handle 110 may be appreciated. The handle 110 has a continuous upper wall portion that establishes a cover 109 to the interior compartment 103 when the handle 110 is in a closed position. Side walls of the handle 110 extend downwardly from the upper cover wall. Two cam surfaces are included at opposite locations upon interior faces of the side walls. Each cam surface has an aperture that serves as a center point therefore. The handle 110 is coupled to the bicycle fork anchor 100 by alignment of the cam surface's center point aperture with a pair of skewer accommodating apertures extending through a side wall of the base 102 and insertion of a skewer 125,130 through each aligned set of paired apertures.

A cam body 114 having a similarly configured cam surface is located interiorly to each of the handle's 110 cam surfaces so that the two cam surfaces are oriented in a face-to-face configuration thereby forming two sets of paired and opposed cam surfaces 115. Each cam body 114 also has a center aperture through which a skewer 125,130 is inserted causing proper orientation of the opposed cam surfaces of each pair. Opposite to the cam surface upon the cam body 114 is a pressing surface 116. Except for one, each cam surface may have any number of cam lobes 117 as long as the number of lobes on opposing cam surfaces are equal. But regardless of the number of lobes 117, the several lobes 117 are spaced angularly equidistantly about the center points. By this construction, when the two cam surfaces are rotated relative to one another about the center points, balanced compression forces are generated that are directed outwardly in a direction parallel to a centerline passing through the center points. In the illustrated embodiment, this centerline is also coincident with the centerline of the skewers of the skewer assembly 122. Because the cam surfaces upon the handle 110 are substantially laterally fixed, relative rotation of the opposed cam surfaces 115 causes the pressing surfaces 116 of the cam bodies 114 to move inwardly.

As the cam bodies 114 move inwardly, their pressing surfaces 116 engage a flanged pressing surface of an interiorly threaded insert cylinder 112. The primary portion of the body of the insert 112 is cylindrically shaped, but with splines or ridges aligned with a longitudinal centerline of the insert 112. The exterior of this primary portion of the insert 112 is configured to be received into a grooved interior hollow space of a rotatable wheel or wheels 146 located interiorly thereto. The complimentary configurations of the engaging surfaces of the insert 112 and the wheel 146 permit longitudinal or translational relative motion, but not rotational relative motion.

The skewers 125,130 have an exteriorly threaded end 126 that screwably engages the interiorly threaded hub of the insert 112 carried within the rotatable wheel 146. A midportion of each skewer 125,130 includes a recessed flat into which a key is insertable that prevents rotational movement of the skewer 125,130 relative to the bicycle fork anchor 100. Longitudinal movement of the skewer 125,130, however, is caused by rotation of the rotatable wheel assembly that includes the rotatable wheel 146 and the sliding insert 112 which ultimately acts on the threads of the skewers 125,130. The ends of the recessed flat act as stops against an inserted key preventing unintentional removal of the skewers 125,130 from the bicycle fork anchor 100. At distal ends of the skewers 125,130 exterior to the base 102 of the bicycle fork anchor 100 are located the skewer heads 129,134. A fork prong receiving portion 136 is located between the outside skewer head 129,134 and the recessed flat. By this construction, different skewers 125,130 may be exchanged for use in the bicycle fork anchor 100 by removing the inserted key and unscrewing the installed skewer from the threaded insert 112 and reinstalling a different skewer. This may be done to accommodate differently sized fork prongs or other variable characteristics, thereby providing even greater versatility to the design of the present invention.

It is contemplated that one monolithic rotatable wheel 146 may be utilized to operate the paired skewers 123 and receive both inserts 112 within a hollow interior thereof. In that case, the engaged threads between the different skewers 125,130 must be oppositely threaded so that rotation of the single wheel 146 in one direction causes opposite relative motion in the two skewers 125,130. This opposition of threading may be accomplished either on the skewers 125, 130 or within the inserts 112. Optionally, two separable wheels 146 may be utilized, one engagable to each skewer 125,130. In this case, the two wheels 146 operate independently and may be separately rotated to affect the appropriate movement of the respective skewers 125,130. When two wheels 146 are used, however, a connector is provided for operatively joining the wheels 146 once the required independent adjustments have been accomplished. In either configuration, a biasing member or extension mechanism 149, illustratively in the form of a compression spring 149, is provided within the rotatable wheel 146 between the inserts 112 for urging the skewers 125,130 toward an extended orientation.

The two wheel 146 configuration permits for the direct accommodation of differently sized prongs on an individual bicycle fork. In the case of a single wheel design, differences in thickness of the prongs is accommodated by a resiliently filled gap space on each side of the adjustment mechanism 145 between adjacent components. In the illustration of FIG. 2, the gap space is provided between the wheel 146 and the insert 112 and the space is filled with a high durometer elastomeric band 148. Alternatively, the band 148 may be interstitially positioned between the insert 112 and the cam body 116; what is important is that the elastomeric member 148 be located between two adjacent components of the constricting mechanism 135 or the adjustment mechanism 145 capable of some degree of axial relative movement one to the other.

The skewer assembly 122 fits within the bicycle fork anchor 100 with a slight degree of play permitting the assembly 122 to move rightwardly or leftwardly in response to forces experienced as the adjustment mechanism 145 is operated and a pre-load is applied to the bicycle prongs. As the wider prong is engaged upon contraction of the skewer heads 129,134, the adjusting mechanism 145 moves toward the more narrow prong and the elastomeric band 148 on the narrow prong side is compressed causing a phantom compensating thickness to be experienced that results in a more even pinch pressure being applied to each prong. Alternatively, the gap space that permits sideward movement of the adjustment 145 and contracting 135 mechanism may be provided between the handle 110 and the side wall of the base 102.

In practice, prior to applying the pinching force that fixes the fork prongs to the anchor 100, the prongs will be positioned on the extended portions of the skewers 125,130 beyond exterior bearing projections 113 off of the base 102. Tight fitting protective caps are placed over the projections 113 for protection from bicycle forks being placed adjacent thereto and to conceal the ports through which the keys are inserted that prevent rotation and the unintentional removal of the skewers 125,130. These projections 113 have bearing surfaces that in a pinched configuration are pressed tightly against interior sides of the fork prongs. On the opposite and exterior side of the prong is an interior engaging surface of the skewer head 129,134 positioned adjacently thereto. To prepare and configure the securing mechanism of the anchor 100 after a bike has been installed upon the skewers 125, 130, the pre-load adjustment wheel 146 is rotated until the skewer heads 129,134 are adjacently positioned proximate to the exterior surfaces of the fork prongs. Exemplarily, the skewer heads 129,134 and the exterior bearing projections 113 cooperate as a fork pinching assembly to secure a bicycle's fork to the anchor 100.

After the skewer heads 129,134 have been appropriately positioned with respect to the fork prongs and possibly pre-loaded, the handle 110 is actuated through an operational pivotal range so that a sufficiently strong pinching force is applied to the fork prongs caused by the relative motion of the paired and opposed cam surfaces 115 to anchor the bicycle to the carrier.

The opposed cam surfaces are of variable inclines and angles so that a three tiered cam is established. A first portion of each opposed cam surface includes a relatively sharp angle or cant which provides rapid contraction of the skewers 125,130 as each engaged cam surface presses away from the other. Because the cam surfaces opposite those connected to the handle are coupled to one skewer 125,130 each, each skewer 125,130 is drawn inwardly with its respective head 129,134 pressing tightly against a fork prong. In the second tier of the camming process, a power stroke is encountered wherein the cam surfaces are oriented at less of an angle and are capable of exerting substantially greater inward pressure over a shorter distance with the skewer heads 129,134. A third phase of the three tiered cam system includes opposing surfaces that are effectively parallel to one another. In this compressed configuration, however, sufficient friction between the abutting cam surfaces prevents any backing off of the handle cam surfaces, even when subjected to bounce and other disturbances. This last tier may be considered as being an over-center position and may be slightly negative, if not flat or parallel. This last range is not only included to provide a lock-down position, but also to provide the user a detectable indication that the appropriate securing pinch-fit has been accomplished. In this lock-down position, the handle 110 establishes the cover 109 to the interior compartment 103. A detent is also provided between the handle 110 and the base 102 of the bicycle fork anchor 100 further insuring that the cover 109 will remain closed until intentionally opened, even if not locked down.

In the case of a single shaft skewer as discussed hereinabove, other components such as the bearing projections 113 may be arranged to be moved laterally relative to the skewer for affecting pinched securement of the bicycle fork to the anchor. Exemplarily, the bearing projections 113 may be driven outwardly by operation of the opposed cam surfaces 115 while the skewer heads 129,134 remain fixed on the single shaft skewer relative to the anchor housing 120.

The handle 110 may be accommodated with a lock 108 that may be used to secure the handle 110 to the base 102 so that the fork prongs of the carried bicycle may not be disengaged until intentionally done so by the owner. Alternatively and as illustrated, the base 102 includes a lock assembly receiver 107 into which a lock assembly 108 is insertable. Two lock assembly receivers 107 are positioned at forward locations clear of the working portions of the bicycle fork anchor 100. In this manner, a lock assembly 108 may be inserted into either receiver 107 depending upon which side is better exposed when the bicycle fork anchor is installed upon the support.

Figure 3:
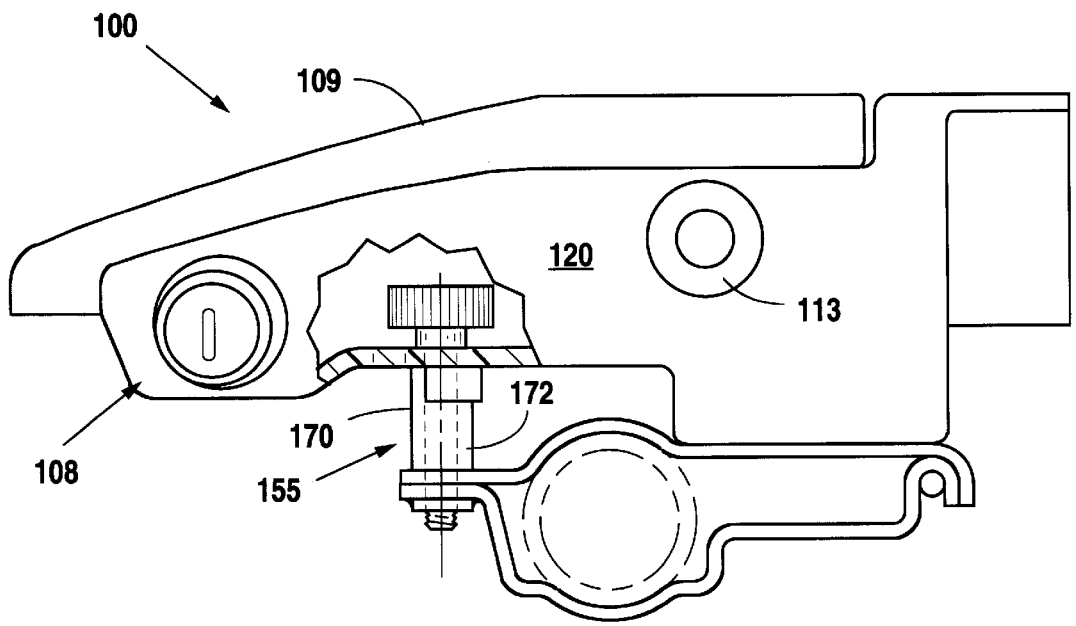
FIG. 3 is a side view showing the bicycle fork anchor mounted upon a rotatable swivel and connected to a load carrier's cross-member.
Figure 6:
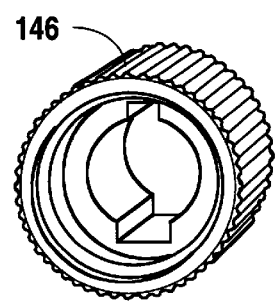
FIG. 6 is a perspective end view of the rotatable wheel showing the interiorly splined receiving space for the matingly engagable cylindrical insert.
Figure 5:
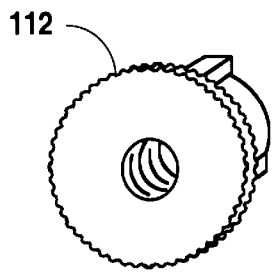
FIG. 5 is a perspective view of the interiorly threaded and exteriorly splined insert cylinder that is translatable within the rotatable adjustment wheel.
Figure 4:
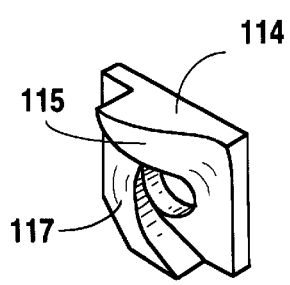
FIG. 4 is a perspective view of a cam piece illustrating the dual lobed and balanced cam surfaces.

In the illustration of FIG. 3, the bicycle fork anchor 100 is shown mounted to a cross-bar of a roof mounted vehicular load carrier. The lower plate extending about the underside of the cross-bar is configured to accommodate both round and square shaped tubular bars. Optionally, a T-shaped insert is attachable to the bottom side of the base 102 and which is coupleable with bars having complimentary receivers.

Alternatively, the hollow rotatable wheel assembly within which the skewers 125,130 are threadedly carried is not controlled by a rotatable wheel 146, but instead incorporates a splined portion that is matingly engageable with a wrench handle. An interior portion of the engaging end of the wrench handle is configured to mate with the exterior splines of the constricting mechanism so that sufficient force can be applied through the wrench handle to appropriately contract the skewer heads inwardly to secure the fork prongs to the anchor base. The wrench styled handle may be locked down to assure that the pinch-pressure is not released from the fork prongs. It should also be noted that smoothed portions of the splined member outboard to the splined mid-section permit the member to free wheel within the wrench handle thereby permitting manual expansion and contraction when the mechanically imposed pinch force is not induced.

In still another embodiment, the driving force for the adjustment mechanism and contracting mechanism is imparted by a ratchet mechanism carried on a handle which engages a splined portion of the interiorly threaded member. The pawl of the ratchet handle may be oriented to contract or expand the skewer pair. As a further enhancement, prevention of over tightening of the contraction mechanism may be achieved by spring biasing the pawl so that when a pre-selected handle pressure is experienced, the pawl will disengage from the splined cylinder and ride over the individual splines thereby preventing additional tightening. The orientation of the pawl may be oppositely rocked into an expanding position so that action of the handle moves the skewer heads outwardly, thereby releasing the fork prongs.

A bicycle fork anchor and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the industries that provide connections for sport equipment articles to storage mounts and vehicular load carriers.

What is claimed and desired to be secured by Letters Patent is as follows:

1. A mechanism for releasably fixing a bicycle's fork upon a support, comprising:
    a bicycle fork anchor having a fork pinching assembly, said fork pinching assembly having two fork prong receiving portions; and
    a handle operably coupled to said fork pinching assembly for configuring said fork pinching assembly between a bicycle fork pre-pinched position and a bicycle fork pinch-secured position, said handle being located between said fork prong receiving portions.

2. The mechanism as recited in claim 1; further comprising:
    an adjustable mounting for permitting said bicycle fork anchor to be canted within a substantially horizontal plane thereby turning the handle bars of a bicycle secured upon said bicycle fork anchor.

3. A mechanism for releasably fixing a bicycle's fork upon a support, comprising:
    a skewer assembly at least partially received within a bicycle fork anchor, said skewer assembly having two fork prong receiving portions, each receiving portion being located exteriorly to opposite sides of said bicycle fork anchor;
    an exterior bearing surface arranged upon said bicycle fork anchor and configurable to secure the bicycle's fork to said anchor; and
    a handle operably coupled to said bicycle fork anchor for configuring said exterior bearing surface between a bicycle fork pre-pinched position and a bicycle fork pinch-secured position, said handle being located between said fork prong receiving portions.

4. A mechanism for releasably fixing a bicycle's fork upon a support, comprising:
    a fork pinching assembly, said fork pinching assembly having:
        a skewer assembly at least partially received within a bicycle fork anchor, said skewer assembly having two fork prong receiving portions, each receiving portion being located substantially exteriorly at opposite sides of said bicycle fork anchor; and
        an exterior bearing surface arranged upon said bicycle fork anchor and arranged for securing the bicycle's fork to said anchor; and
    a handle operably coupled to said fork pinching assembly for configuring said fork pinching assembly between a bicycle fork pre-pinched position and a bicycle fork pinch-secured position, said handle being located between said fork prong receiving portions.

* * * * *